3,457,252
METAL COMPLEXES OF DISAZO-DYESTUFFS
Fritz Meininger, Frankfurt am Main, Germany, assignor to Farbwerke Hoechst Aktiengesellschaft vormals Meister Lucius & Brüning, Frankfurt am Main, Germany, a corporation of Germany
No Drawing. Filed Sept. 6, 1966, Ser. No. 577,196
Claims priority, application Germany, Sept. 7, 1965, F 47,105; Apr. 27, 1966, F 49,022
Int. Cl. C09b 45/28, 62/84
U.S. Cl. 260—148                 6 Claims

ABSTRACT OF THE DISCLOSURE

Complex metal compounds of fibre-reactive disazo-dyestuffs containing 1 or 2 reactive groupings of the formulae

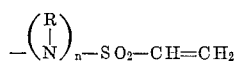

and

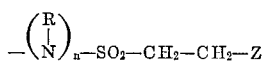

in which R represents hydrogen or lower alkyl, Z represents —Cl, —O—SO$_3$H, —S—SO$_3$H, —N(lower alkyl)$_2$,

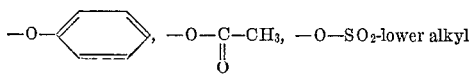

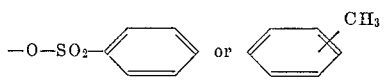

and $n$ stands for 0 or 1, said dyestuffs being suitable for the dyeing or printing of textile materials consisting of natural or regenerated cellulose fibres, wool, silk or polyamide fibres, the dyeings or prints obtained on these materials being distinguished by a high tinctorial strength.

---

The present invention relates to disazo dyestuffs and their complex metal compounds as well as to processes for preparing them; particularly, the invention relates to disazo dyestuffs corresponding to the general formula

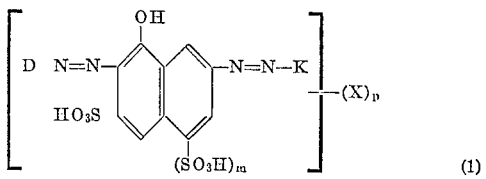

wherein D represents the radical of a diazo component of the benzene or naphthalene series which may contain, in o-position to the azo group, a group capable of forming metal complex or being converted in a group of this kind under the condition of metallization, K stands for the radical of a coupling component of the benzene or naphthalene series, X means a grouping of the formula

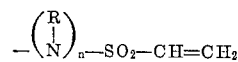

or

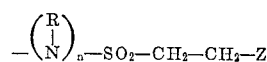

linked to D and/or K in which R represents a hydrogen atom or a hydrocarbon radical containing 1 to 4 carbon atoms, Z stands for a radical, which can be split off by alkaline agents $m$ and $n$ represent the numbers 0 or 1, and $p$ represents the number 1 or 2 and their metal complex compounds.

It has been found that valuable disazo dyestuffs of the general formula

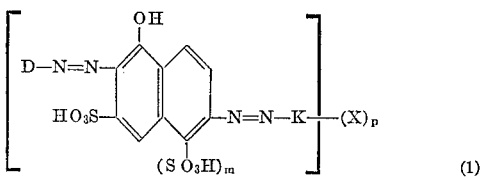

in which D represents the radical of a diazo component of the benzene or naphthalene series which may contain, in o-position to the azo group, a group capable of forming metal complex or being converted in a group of this kind under the condition of metallization, K stands for the radical of a coupling component of the benzene or naphthalene series, X means a grouping of the formula

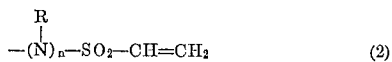

or

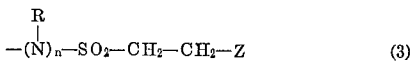

linked to D and/or K in which R represents a hydrogen atom or a hydrocarbon radical containing 1 to 4 carbon atoms, Z stands for a radical, which can be split off by alkaline agents, $m$ and $n$ represent the numbers 0 or 1, and $p$ represents the number 1 or 2 and their metal complex compounds, can be obtained (a) By diazotizing an aminoazo dyestuff corresponding to the formula

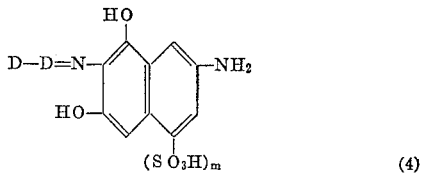

wherein D and $m$ have the aforesaid meanings and by coupling it with a coupling component of the benzene or naphthalene series or (b) by coupling an azo dyestuff corresponding to the general formula

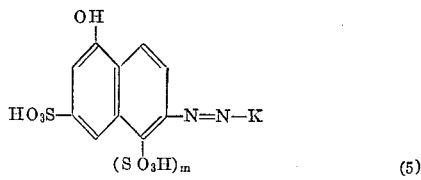

wherein K and $m$ have the aforesaid meanings, with a diazo component of the benzene or naphthalene series, which may contain, in o-position to the azo group, a group capable of forming metal complexes or of being converted into a group of this kind under the conditions of metallization, or (c) by converting, under the action of an agent yielding metal, an aminoazo dyestuff of the above Formula 4, wherein D represents the radical of a diazo component of the benzene or naphthalene series which, in o-position to the azo group, contains a hydroxyl or carboxyl group, into the corresponding complex metal compound, diazotizing in an acid medium, preferably in a weakly acid medium, for instance in the presence of acetic acid, the complex metal dyestuff thus obtained and coupling it with a coupling component of the benzene or naphthalene series and when operating in this way, the components are selected in such a manner that, at least one of the reaction components used contains a grouping of the Formula 2 or 3 linked to D and/or to K, and the metal-free disazo dyestuffs obtained according to the methods of operations (a) and (b) are, if desired, converted, under the action of agents yielding metal, in substance or on a substrate, into the corresponding complex metal compounds, or the metal containing disazo dyestuffs obtained according to the methods of operation described sub (c) are, if desired, freed from metal.

For completion of the coupling reaction, it is advantageous to use a small excess, for instance about 1.1 mols of the coupling component per 1 mol of the diazo component. As radicals Z, which may be split off under the action of an alkaline agent, for instance, the following radicals may be mentioned: a halogen atom, such as the chlorine atom, an alkyl- or arylsulfonic acid ester group as well as acyloxy groups such as the acetoxy group, moreover a phenoxy or a dialkylamino group, for instance the dimethyl- or diethylamino group, furthermore the thiosulfuric acid ester group and particularly the sulfuric acid ester group.

The diazo and coupling components used for the preparation of the disazo dyestuffs according to the invention may contain, in addition to one of the groupings 2 or 3 mentioned before, substituents usual in azo dyestuffs, such as halogen atoms, alkyl, alkoxy nitro, hydroxy, carboxylic acid, amino, acetylamino, benzoylamino, and particularly sulfonic acid groups.

The dyestuffs of Formula 1 can be converted on a substrate or preferably in substance to their complex metal compounds. As agents yielding metal preferably copper, cobalt and complex chromium compounds are used. For instance, the corresponding water-soluble salts, such as sulfates, chlorides, acetates, formiates and the salts of organic sulfonic acids are appropriate.

In the case of cobalt and chromium compounds being used for the metallization, the 1:2 complex metal compound of the dyestuff of the Formula 1 or of the aminoazo dyestuff of the Formula 4 are obtained, whereas, when using agents yielding copper, the corresponding 1:1 complex metal dyestuff is formed.

As groups forming metal complexes or capable of being converted into groups of this kind under the conditions of the metallization, first of all the hydroxyl group, further the carboxyl group and the alkoxy groups are to be mentioned.

The complex metal compounds obtainable according to method of operation (c) can easily be freed from metal in the manner known per se, whereby metal-free o,o'-dihydroxy-disazo dyestuffs of the Formula 1 mentioned before are formed. These may subsequently be converted into the complex compound of another metal. Thus it is for instance possible to decopper, by means of a sulfide or of a diluted mineral acid, the complex copper compounds obtainable according to the invention and subsequently to convert the metal-free disazo dyestuffs into the complex compounds of chromium or cobalt.

Instead of using diazo or coupling components containing a group of the Formula 3 mentioned before, this group may also be introduced subsequently into the finished disazo dyestuff in the course of a modification of the process of preparation. For instance, a grouping of the Formula 2 present in the disazo dyestuffs obtainable according to the process may be reacted with salts of the thiosulfuric acid, whereby a β-thiosulfato-ethyl-group is formed. Furthermore, the mentioned group of the Formula 2 can be converted into a β-dialkylamino-ethyl group by reaction with a dialkylamine.

On the other hand, dyestuffs containing groups of the Formula 3 may be converted into dyestuffs containing groups of the Formula 2 by treatment with agents showing an alkaline reaction, such as sodium hydroxide.

A further modification of the process consists in that, for the preparation of the disazo dyestuffs of the Formula 1 diazo components or coupling components are used which contain, instead of the groupings 2 or 3 mentioned before, one group corresponding to the formula

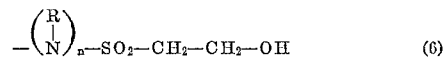

wherein R and $n$ have the meanings mentioned before, and the β-hydroxy group in the disazo dyestuffs is converted into the sulfuric acid semi-ester group, before or after the metallization of the dyestuffs in substance—according to the method known per se.

In metal-free form or preferably as complex compounds of copper, cobalt or chromium, the disazo dyestuffs obtainable according to the process described before may be advantageously used for dyeing textiles. These new dyestuffs are distinguished by a high tinctorial strength and they are applicable for dyeing wool, silk and polyamide fibers, in which case they may be applied in an acid, neutral or weakly alkaline dyeing-bath. They are particularly valuable as "reactive dyestuffs" for dyeing or printing cotton and other natural or regenerated cellulose fibers. The dyeing of such materials is carried out according to printing and dyeing processes in which the dyestuffs are fixed on the fiber material fast to washing with an acid-binding agent, such as sodium hydroxide, sodium carbonate or sodium bicarbonate. Processes of this kind are known from the recent literature (see Melliand Textilberichte 1959, 539, and 1965, 286). According to these processes, above all, cellulose textiles can be dyed deeply navy-blue, blue as well as blue-grey and similar shades having essentially better fastnesses to washing than, as far as the tint is concerned, comparable dyeings with direct dyestuffs. Amongst the properties of fastness, particularly the good fastnesses to wetting and light as well as the good fastness of the dyeings and prints to dry cleaning are worth being mentioned.

The following examples serve to illustrate the invention but they are not intended to limit it thereto, the parts being by weight unless otherwise stated.

Example 1

(a) 21.7 parts of 2 - amino-1-hydroxybenzene-4-β-hydroxyethylsulfone are introduced while stirring into 66 parts of concentrated sulfuric acid and stirred until entire dissolution sets in. Thereupon, the solution is added to 140 parts of ice and 27 parts of water and diazotized, at 0°–5°, with 20 parts by volume of 5 N sodium nitrite solution. Subsequently, the solution is cautiously neutralized by adding 60 parts of sodium carbonate.

(b) 25.2 parts of 2-amino-5-hydroxynaphthalene-7-sulfonic acid (95%) are stirred with 150 parts by volume of water and dilute sodium hydroxide solution is added at a pH value of 7.5 and then the diazonium salt solution prepared according to (a) is combined with the solution wherein the pH value of 7.5 is maintained by adding sodium carbonate. After completion of the coupling, the amino azo dyestuff is salted out with 20% of sodium chloride (referred to the volume of the solution). It is filtered off and washed with sodium chloride solution of a strength of 20% by weight.

(c) The moist. filtration residue is dissolved in 500 parts by volume of water at 80° C. 20 parts by volume of 5 N sodium nitrite solution are introduced into the solution obtained, and cooled to 40° C. Then the dyestuff solution is introduced into a mixture of 100 parts of ice powder and 50 parts by volume of 5 N hydrochloric acid. After completion of the diazotization the suspension is adjusted to the pH value of 5.5 with 2 N sodium carbonate solution and combined with a solution of 50.0 parts of 1-amino-8-hydroxynaphthalene-2,4-disulfonic acid, 200 parts by volume of water and 65 parts by volume of 2 N sodium carbonate solution. By adding 2 N sodium carbonate solution the pH value is maintained at 5.5 to 6.0 while the coupling is completed. The dyestuff solution is then filtered off of 60° C. and salted out with 20% of sodium chloride (referred to the volume of the solution). The disazo dyestuff obtained is isolated by filtration and washed with dilute potassium chloride solution.

(d) The moist filtration residue is then dissolved at 50° C., in 500 parts by volume of water and 30 parts of crystallized sodium acetate, 56 parts by volume of 2 N sodium carbonate solution and 25 parts of crystallized copper sulfate are added. The dyestuff solution is stirred for 2 hours, at 60° C. and at a pH value of 5.0 to 5.2 and subsequently 25% of potassium chloride are added (referred to the volume of the solution). The solution is cooled to 5° C. and filtered off. The product is washed with aqueous potassium chloride solution and subsequently dried, at 50°–60° C., in vacuo. The copper complex-disazo dyestuff obtained which, in form of a free acid has the following formula

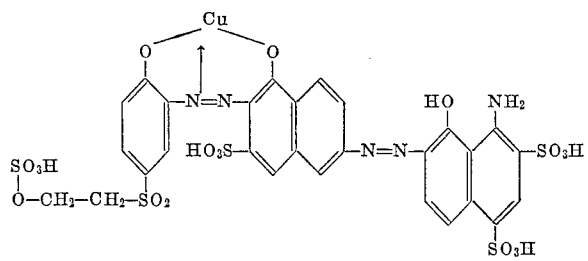

represents black-blue powder dissolving in water producing a blue solution.

A cotton fabric is treated at 50° C. for 1 hour with 1000 parts by volume of a bath containing 5 parts of the abovementioned dyestuff, 50 parts of sodium sulfate and 10 parts of sodium hydroxide. Then the dyeings are rinsed again, while boiling, then saponified while boiling, rinsed again and dried. These is obtained a full navy blue dyeing having excellent fastness to light and good fastness to washing as well as dry cleaning.

When in the above-mentioned example 31.3 parts of 2-amino - 1 - hydroxybenzene-4-(β-thiosulfate-ethylsulfone) or 27.7 parts of 2-amino-1-hydroxybenzene-4-(β-diethylaminoethyl-sulfone) instead of the sulfuric acid ester of 2-amino - 1-hydroxy-benzene-4-β-hydroxyethylsulfone are used, there is obtained a dyestuff with similar good properties.

Example 2

The disazo dyestuff obtained according to Example 1, paragraph (c) which, in form of a free acid has the following formula

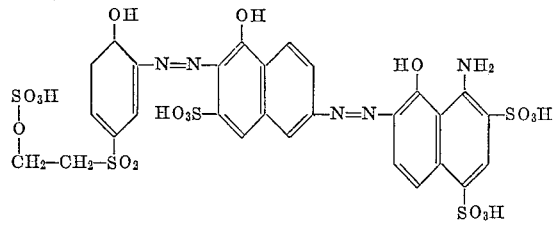

is dissolved in 1000 parts by volume of water by heating it to 50° C. To the dyestuff solution 30 parts of chrome alum and 50 parts of crystallized sodium acetate are added. The mixture is then adjusted to the pH value of 5.5 by adding 2 N sodium carbonate solution and boiled under reflux for 12 hours. When the chromium complex formation is completed it is cooled and the dyestuff obtained is salted out with 25–30% of potassium chloride (referred to the volume of the solution). The dyestuff that has precipitated, is filtered off after stirring for 10 hours, washed aagin with an aqueous potassium chloride solution and dried at 50–60° C., in vacuo.

A dark powder is obtained, which consists of the 2:1 chromium complex of the dyestuff of the above-mentioned formula and of inorganic salts. In the presence of sodium bicarbonate the new dyestuff gives a bluish grey cotton print, which is fast to washing.

Example 3

(a) 26.0 parts of the amino-monoazodyestuff which has been obtained by coupling diazotized 2-amino-1-hydroxybenzene-4,6-disulfonic acid with 2-amino-5-hydroxynaphthalene-7-sulfonic acid in an alkaline medium are dissolved in 350 parts by volume of water while adding a dilute sodium carbonate solution in order to give a neutral solution. Thereafter, 10.5 parts by volume of 5 N sodium nitrite solution are added. The solution obtained is then slowly fed into a mixture of 20 parts by volume of concentrated hydrochloric acid and 100 parts of ice, while stirring. After diazotization the mixture is combined with a neutralized solution of 26.5 parts of the compound corresponding to the formula

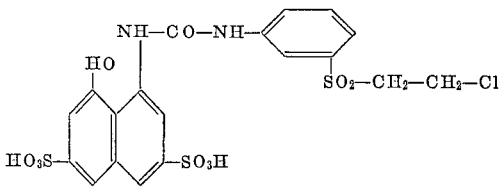

in 300 parts by volume of water at 10° C. and adjusted to a pH value of 6.0 to 6.3 while adding a sodium bicarbonate. After completion of the coupling 20 parts by volume of concentrated hydrochloric acid as well as 25% of potassium chloride (referred to the volume of the solution) are added to the dyestuff solution. The disazo dyestuff precipitated, is then filtered off and washed again with potassium chloride solution.

(b) The disazo dyestuff prepared according to paragraph (a) is dissolved in 600 parts by volume of water while adding sodium bicarbonate in order to give a neutral solution. 30 parts of crystallized sodium acetate and 12.5 parts of crystallized copper sulfate are added to the solution and the mixture is stirred for 2½ hours at 80° C. The complex copper dyestuff formed, which in form of the free acid corresponds to the formula

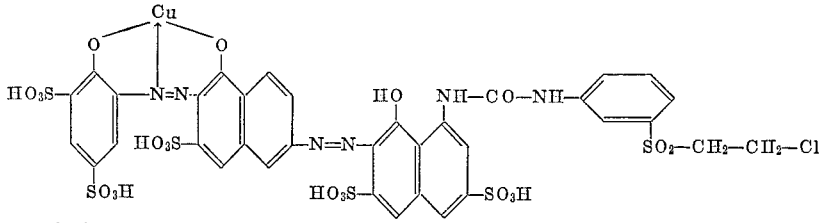

is salted out with 25% of potassium chloride (calculated on the volume of the solution), isolated by filtration and dried at 60° C. in vacuo.

A dark blue powder is obtained, which easily dissolves in water, producing a blue solution. In the presence of sodium hydroxide, full greenish blue cotton tints can be produced with the new dyestuff which are very fast to washing and to light.

Example 4

22.8 parts of the monoazodyestuff which have been obtained by coupling diazotized 2-amino-5-hydroxynaphthalene-7-sulfonic acid with 1-amino-8-hydroxynaphthalene-3,6-disulfonic acid in an alkaline medium are introduced as trisodium salt into a diazosuspension which has been prepared by diazotizing 13.9 parts of 2 - amino-1,4-dimethoxy - 5 - β-hydroxyethylsulfone sulfuric acid ester (98%) in a mixture of 300 parts by volume of water and 10 parts by volume of concentrated hydrochloric acid with 8 parts by volume of 5 N sodium nitrite solution. The mixture is then adjusted to a pH value of 6.0 to 6.5 by adding sodium carbonate and maintained at this value by further addition of sodium carbonate until coupling is completed.

Subsequently, acetic acid of bis pH value of up to 5.1 and then 10 parts of crystallized copper sulfate and 12 parts of crystallized sodium acetate are added to the blue dyestuff solution formed and the whole is kept, for 17 hours, at the boiling temperature. The solution is cooled to 0–5° C. and saturated with potassium chloride, whereby the complex copper dyestuff formed is salted out, if desired, by adding methanol. The product is filtered off, washed with potassium chloride solution and dried. The dyestuff corresponding, in form of the free acid, to the formula

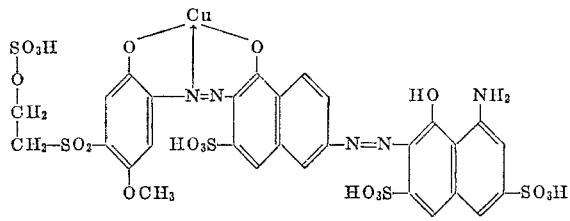

represents a blue powder dissolving in water while producing a blue dyeing.

On cotton, in the presence of sodium hydroxide, deep blue dyeings are obtained, which are very fast to light and dry cleaning.

Example 5

76.1 parts of the disazo dyestuff obtained from the aminoazo dyestuff corresponding to the formula

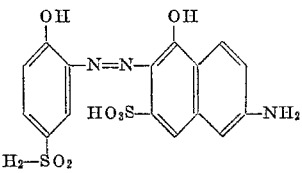

by diazotizing and acid coupling with 1-amino-8-hydroxynaphthalene-2,4-disulfonic acid are slowly introduced as finely ground potassium salt into 650 parts of concentrated sulfuric acid and stirred, for several hours, at room temperature until entire dissolution sets in. The mixture is poured while stirring on 1,800 parts of ice, the esterified dyestuff is salted out by adding potassium chloride and filtered off with suction. The moist filter cake is then washed with potassium chloride solution, until no acid reaction is observed and then dried in vacuo at 60–70° C.

When fixing on cotton or cellulose, in the presence of an acid-binding agent, and subsequently treating the dyeing with an acetic copper sulfate solution, a navy blue dyeing fast to washing is obtained, which is identical with the dyeing obtained according to Example 1, paragraph (d).

Example 6

82.3 parts of the complex copper disazo dyestuff obtained from the diazotized aminoazo dyestuff corresponding to the formula

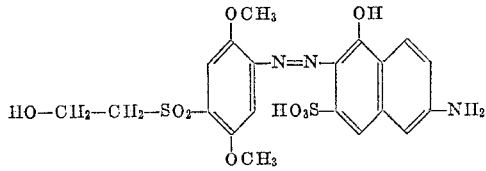

by coupling with 1-amino-8-hydroxynaphthalene-3,6-disulfonic acid in an alkaline medium and subsequent demethylating coppering, are introduced as finely ground potassium salt into 920 parts by volume of anhydrous pyridine and, after adding 8 parts of urea, heated to 85° C. At this temperature, 40 parts of amidosulfonic acid are introduced successively and then heated, for about 1 hour, to 100–105° C. Thereafter, about 600 parts by volume of pyridine are distilled off in vacuo and, after cooling, the mixture is poured into 2,400 parts by volume of water. By cautiously adding diluted hydrochloric acid, the mixture is weakly acidified and then saturated with potassium chloride. The dyestuff precipitated is isolated and dried as usual. A dark powder is obtained which, in the presence of sodium carbonate, yields navy blue dyeings on cellulose fibers, which are fast to light and washing. The dyestuff is identical with that described in Example 4.

Example 7

45.2 parts of the complex copper disazo dyestuff, which was obtained according to Example 1, paragraph (d), are dissolved, at 50–60° C. in form of the potassium salt, in 800 parts by volume of water. 15 parts of diethylamine are added dropwise at 40–50° C. Now the mixture is stirred for 16–20 hours, at 20–40° C. and subsequently adjusted, by means of diluted acetic acid, to the pH value of 6.0. The dyestuff is salted out with potassium chloride, washed with potassium chloride solution and dried. It corresponds as free acid to the formula

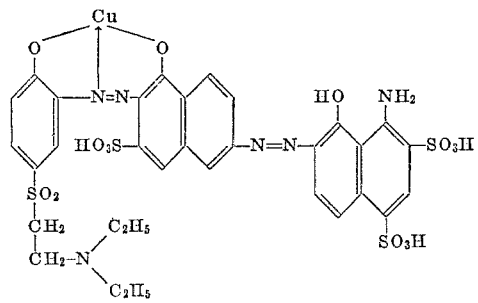

and produces on cellulose, in the presence of sodium hydroxide, a navy blue print, which is fast to light and dry cleaning.

Example 8

42.1 parts of the complex copper disazo dyestuff obtained from the diazotized aminoazo dyestuff corresponding to the formula

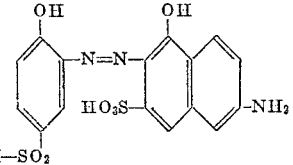

by coupling with 1-amino-8-hydroxynaphthalene-3,6-disulfonic acid in an alkaline medium and subsequent coppering are dissolved as potassium salt in 875 parts by volume of water at 50–60° C. The solution is adjusted with acetic acid to the pH value of 5.2 to 5.7 and then 20 parts of crystallized sodium thiosulfate are added. The mixture is stirred for 7 hours at 55–65° C. whereby the pH value is maintained by adding dropwise diluted acetic acid. The dyestuff solution is filtered while hot and subsequently evaporated in vacuo. A dark blue powder is obtained which dissolves in water while producing a reddish blue dyeing. As free acid the dyestuff corresponds to the formula

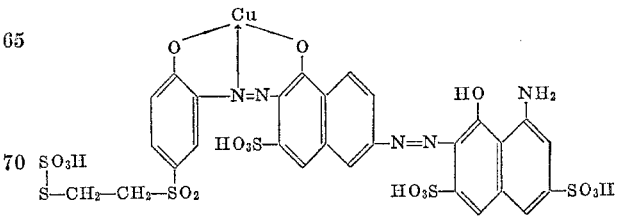

and produces on cellulose fibers, in the presence of sodium hydroxide, a full navy blue dyeing, which has good fastness to light and to wetting.

Example 9

65.9 parts of the aminoazo dyestuff corresponding to the formula

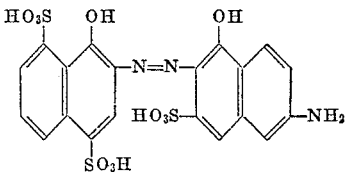

are dissolved, in the form of sodium salt, into 895 parts by volume of water at 60–70° C. and 20 parts by volume of 5 N sodium nitrite solution are added. The solution obtained is poured within one hour on a mixture of 200 parts of ice and 20 parts by volume of concentrated hydrochloric acid, so that the temperature does not exceed 5° C. The mixture is stirred for 4 hours at 0–5° C. and separates the nitrous acid in excess by adding aminosulfonic acid. By adding sodium carbonate the pH value adjusts to 6.5 and 150.5 parts of disodium salt of 1-[4'-N-methyl - β - chloroethylsulfonylamino)-benzoylamino] - 8 - hydroxynaphthalene-3,6-disulfonic acid (38%) are added to the solution of the diazonium salt. By adding dropwise a diluted sodium carbonate solution the coupling mixture is maintained at a pH value of 6.5 to 7.0. After completion of the coupling 27 parts of crystallized copper sulfate as well as 35 parts of crystallized sodium acetate are added and the pH value is adjusted to 5.0 to 5.5 by adding diluted acetic acid. The mixture is stirred for 2 hours at 60° C. and evaporated in vacuo for isolation of the complex copper dyestuff obtained. As free acid the dyestuff corresponds to the formula

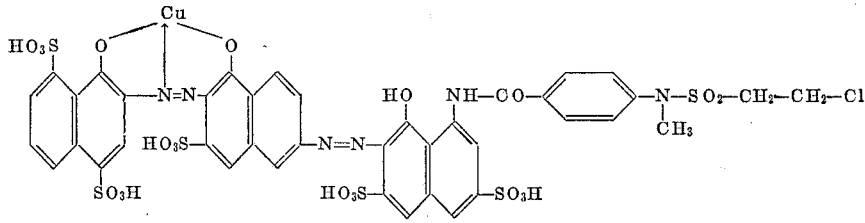

and produces on cotton, in the presence of sodium hydroxide a full covered blue dyeing which has good fastness to light and dry cleaning.

The dyestuffs listed in the following table can be prepared in a manner similar to that described in the preceding examples. They also produce on cellulose materials dyeings and prints with the same good fastnesses mentioned before.

The Roman notation numerals given in the table mean that, for the preparation of the dyestuffs according to the invention as medium component either 2-amino-5-hydroxy-naphthalene-7-sulfonic acid (I) or 2-amino-5-hydroxy-naphthalene-1,7-disulfonic acid (II) have been used.

| Diazo component | Medium component | Coupling component | Metal | Shade |
| --- | --- | --- | --- | --- |
| 2-amino-1-methoxybenzene-4-β-hydroxyethylsulfone-sulfuric acid ester. | (I) | 1-amino-8-hydroxy-naphthalene-3,6-disulfonic acid | | Navy blue. |
| 2-amino-1-hydroxybenzene-4-β-hydroxyethylsulfone-sulfuric acid ester. | (I) | 1-hydroxynaphthalene-4,7-disulfonic acid | Cu | Do. |
| Do | | (I) | 1-hydroxynaphthalene-4,8-disulfonic acid | Cu | Do. |
| Do | | (I) | 2-aminonaphthalene-5,7-disulfonic acid | Cu | Violet. |
| Do | | (I) | 1-acetylamino-8-hydroxynaphthalene-4,6-disulfonic acid. | Cu | Navy blue. |
| 2-amino-1-hydroxybenzene-5-β-hydroxyethylsulfone-sulfuric acid ester. | (I) | 1-amino-8-hydroxynaphthalene-2,4-disulfonic acid. | Cu | Greenish blue. |
| 2-amino-1-hydroxybenzene-4-β-hydroxyethylsulfone-sulfuric acid ester. | (I) | 1-hydroxynaphthalene-3,6-disulfonic acid | Cu | Navy blue. |
| Do | | (I) | 3-acetylamino-5-hydroxynaphthalene-7-sulfonic acid. | Cr | Blue grey. |
| 2-amino-1-hydroxybenzene-4-sulfonic acid | (I) | 3-[4'-(N-methyl-β-chloroethylsulfonylamino)-benzoylamino]-5-hydroxy-naphthalene-7-sulfonic acid. | Cu | Navy blue. |
| 2-amino-1-hydroxybenzene-5-β-hydroxyethylsulfone-sulfuric acid ester. | (I) | 1-acetylamino-8-hydroxynaphthalene-3,6-disulfonic acid. | Cu | Do. |
| 2-amino-1-hydroxybenzene-4-β-hydroxyethylsulfone-sulfuric acid ester. | (I) | do | Cr | Do. |
| 2-amino-1-hydroxybenzene-4-β-dimethylamino-ethyl-sulfone. | (I) | 1-amino-8-hydroxynaphthalene-2,4-disulfonic acid. | Cu | Do. |
| 2-amino-1-hydroxybenzene-4-β-hydroxyethyl-sulfone sulfuric acid ester. | (I) | 1-vinylsulfonylamino-8-hydroxynaphthalene-3,6-disulfonic acid. | Cu | Do. |
| 2-amino-1-hydroxy-4-methoxybenzene-5-β-hydroxy-ethyl-sulfone-sulfuric acid ester. | (I) | 1-hydroxynaphthalene-4-β-hydroxyethylsulfone-sulfuric acid ester. | Cu | Do. |
| 2-amino-1-hydroxybenzene-4-β-diethylaminoethyl-sulfone. | (I) | 1-(β-diethylamino-ethylsulfonylamino)-8-hydroxynaphthalene-3,6-disulfonic acid. | Cu | Do. |
| 2-amino-1-hydroxybenzene-4-β-acetoxyethyl-sulfone | (I) | 1-acetylamino-8-hydroxy-naphthalene-3,6-disulfonic acid. | Cu | Do. |
| 2-amino-1-hydroxybenzene-4-β-hydroxyethylsulfone-sulfuric acid ester. | (I) | 1-hydroxynaphthalene-4-sulfonic acid | Cr | Do. |
| 2-amino-1-hydroxy-4-(N-methyl-vinylsulfonylamino)-benzene. | (I) | 1-acetylamino-8-hydroxynaphthalene-3,6-disulfonic acid. | Cu | Do. |
| 2-amino-6-nitro-1-hydroxybenzene-4-β-hydroxyethyl-sulfone-sulfuric acid ester. | (I) | do | Cu | Do. |
| 2-amino-6-nitro-1-hydroxybenzene-4-β-hydroxyethyl-sulfone-sulfuric acid ester. | (I) | do | Cu | Do. |
| 2-amino-1-hydroxybenzene-4-β-hydroxyethylsulfone-sulfuric acid ester. | (I) | 1-hydroxy-naphthalene-4-sulfonic acid | Cu | Violet. |
| 2-amino-1-hydroxybenzene-4-β-hydroxyethylsulfone-thiosulfuric acid ester. | (I) | 1-benzoylamino-8-hydroxynaphthalene-3,6-disulfonic acid. | Cr | Bluish grey. |
| 2-amino-1-hydroxybenzene-4-β-hydroxyethylsulfone-sulfuric acid ester. | (I) | 2-hydroxynaphthalene-6,8-disulfonic acid | Cu | Navy blue. |
| 2-amino-1-hydroxybenzene-4,6-disulfonic acid | (I) | 1-[4'-(N-methyl-β-chlorethyl-sulfonylamino)-benzoylamino]-8-hydroxy-naphthalene-3,6-disulfonic acid. | Cu | Greenish navy blue. |
| 2-amino-1-hydroxynaphthalene-4,8-disulfonic acid | (I) | do | Cu | Navy blue. |
| 2-amino-1-hydroxy-4-(N-butyl-ethionylamino)-benzene. | (I) | 1-amino-8-hydroxynaphthalene-2,4-disulfonic acid. | Cu | Do. |
| 2-amino-1-hydroxybenzene-4-β-hydroxyethyl-sulfone-sulfuric acid ester. | (I) | do | Co | Do. |
| 2-amino-1-hydroxybenzene-4-sulfonic acid | (I) | 3-(N-ethylthionylamino)-5-hydroxynaphthalene-7-sulfonic acid. | Cu | Do. |
| 2-amino-1-hydroxybenzene-4-β-phenoxyethylsulfone | (I) | 1-benzoylamino-8-hydroxynaphthalene-3,6-disulfonic acid. | Cu | Do. |

| Diazo component | Medium component | Coupling component | Metal | Shade |
|---|---|---|---|---|
| 2-amino-1-hydroxybenzene-4-β-hydroxyethylsulfone-methylsulfonic acid ester. | (I) | 1-hydroxynaphthalene-5-sulfonic acid | Cu | Violet. |
| 4-chloro-2-amino-1-hydroxybenzene | (II) | 1-vinylsulfonylamino-8-hydroxynaphthalene-3,6-disulfonic acid. | Cu | Navy blue. |
| 3-amino-4-hydroxybenzoic acid | (I) | ___do___ | Cu | Do. |
| 2-amino-6-acetylamino-1-hydroxybenzene-4-sulfonic acid. | (I) | ___do___ | Cu | Do. |
| 2-amino-1-hydroxybenzene-4,6-disulfonic acid | (I) | 3-(N-methylethionylamino)-5-hydroxynaphthalene-7-sulfonic acid. | Cu | Do. |
| Do | (I) | 1-vinylsulfonylamino-8-hydroxynaphthalene-3,6-disulfonic acid. | Cu | Blue. |
| 1-aminobenzene-3-β-hydroxyethylsulfonic-sulfuric acid ester. | (I) | 1-amino-8-hydroxynaphthalene-3,6-disulfonic acid | | Blue violet. |
| 2-amino-1-hydroxybenzene-4-β-hydroxyethylsulfone-sulfuric acid ester. | (I) | 1,3-dihydroxybenzene | Cu | Brown violet. |
| Do | (I) | ___do___ | Co | Violet. |
| 2-amino-1-carboxybenzene-4-β-hydroxyethylsulfone-sulfuric acid ester. | (I) | 1-amino-8-hydroxynaphthalene-3,6-disulfonic acid. | Co | Navy blue. |
| Do | (I) | ___do___ | Cr | Blue. |

Example 10

(a) 54.2 parts of the aminoazo dyestuff corresponding to the formula

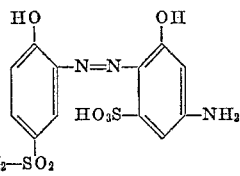

are introduced, in form of the sodium salt, into 670 parts by volume of water and 27.5 parts of crystallized copper sulfate and 20 parts of crystallized sodium acetate are added. The mixture is stirred, for 2 hours, at 60°–65° C. (pH value 4.8), whereby a red-brown solution is formed. The complex copper dyestuff precipitated is salted out with 25% of potassium chloride (referred to the volume of the solution), filtered off and washed with potassium chloride solution.

(b) The dyestuff prepared according to paragraph (a) corresponding as free acid to the formula

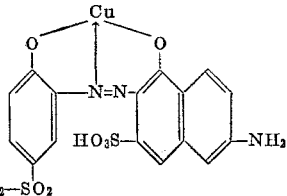

is dissolved, at a temperature of 70° C., in order to give a neutral solution in 750 parts by volume of water and 20 parts by volume of 5 N sodium nitrite solution are added. The dyestuff solution obtained still warm, is introduced dropwise into a mixture of 200 parts of ice powder and 20 parts by volume of glacial acetic acid and 33 parts by volume of 2 N hydrochloric acid (pH value 4) which is vigorously stirred. Stirring is continued for 1 hour, at 0°–5° C. and the pH value is adjusted to 5.0 by introducing subsequently sodium carbonate. This mixture is combined with a neutralized solution of 39.7 parts of 1-aceylamino-8-hydroxynaphhalene-3,6-disulfonic acid in 250 parts by volume water. The coupling is carried out at a pH valve of 6.0 to 6.5 by introducing sodium carbonate and the complex copper dyestuff which, as free acid corresponds to the formula

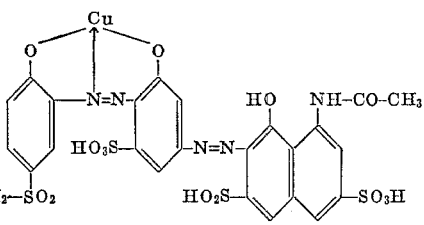

is isolated by salting it out with 25% of potassium chloride (referred to the volume of the solution), by filtrating and drying at 60° C., in vacuo.

On cotton, in the presence of sodium carbonate, a dark blue salt containing powder is obtained, which produces full navy blue prints which have good fastness to washing and light.

Example 11

(a) 54.2 parts of the aminoazo dyestuff corresponding to the formula

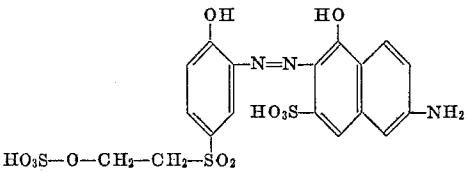

are dissolved, in form of sodium salt in 800 parts by volume of water at 80° to 90° C. and 15.4 parts of crystallized cobaltsulfate and 13 parts of crystallized sodium acetate are added. The mixture is stirred for 4 hours at 70°–75° C. until complete formation of the cobalt complex compound. It is subsequently cooled to 10° C. and saturated with potassium chloride. The dyestuff precipitated is filtered and washed with potassium chloride solution.

(b) The dyestuff obtained according to (a) corresponding as free acid to the formula

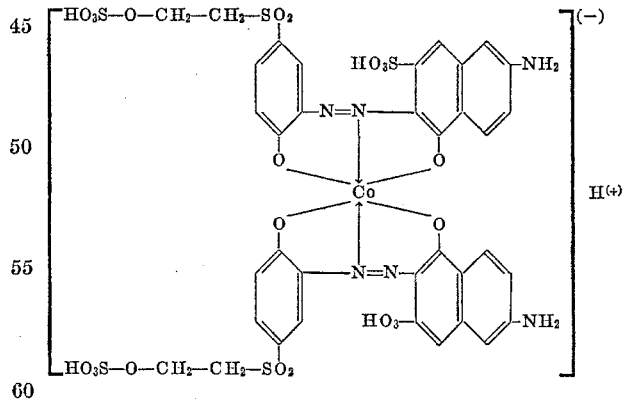

is dissolved in a mixture of 610 parts by volume of water and 20 parts by volume of 5 N sodium nitrite solution. This solution is allowed to run, at 0°–10° C., into a mixture of 150 parts of ice powder and 20 parts by volume of concentrated hydrochloric acid. The nitrous acid in excess is removed by adding amidosulfonic acid. The diazonium salt solution is neutralized to the pH value of 6.0 by means of sodium bicarbonate and combined with a neutralized solution of 56.1 parts of 1-amino-8-hydroxynaphthalene-2,4-disulfonic acid (56.9%) in 200 parts by volume of water. Coupling is carried out at pH value 6.0 to 6.5 and the 1:2 complex cobalt dyestuff may be isolated by salting it out with potassium chloride. The product is filtered off, washed with sodium chloride solution and dried.

A dark salt-containing powder is obtained, containing the dyestuff of the structure

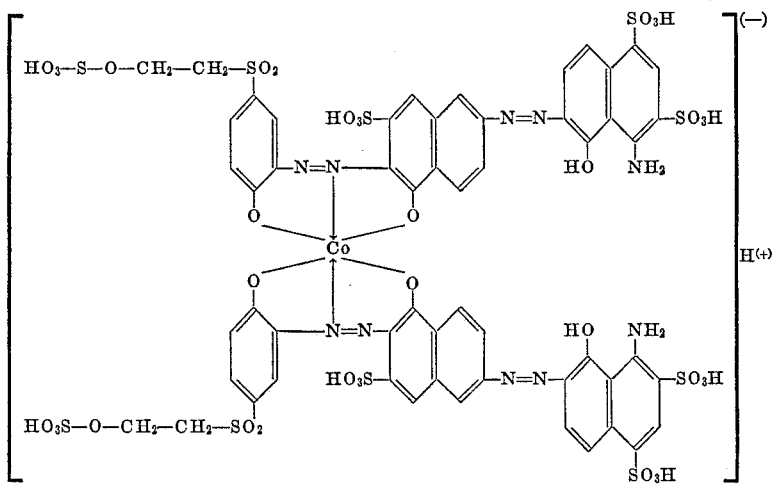

in form of the sodium salt.

When fixing it on cotton, in the presence of sodium hydroxide, a navy blue dyeing is obtained, which is fast to dry cleaning and washing.

Example 12

(a) For conversion into the complex chromium compound, 54.2 parts of the aminoazo dyestuff of the formula mentioned in Example 10(a) are dissolved in 1150 parts by volume of water in order to give a neutral solution, and 25 parts of chromium alum and 30 parts of crystallized sodium acetate are added (pH value 5.0). The mixture is boiled, for 11 hours, under reflux and thereafter cooled to 20° C. The dyestuff obtained is salted out with 25% of sodium chloride (referred to the volume of the solution), filtered off and washed with sodium chloride solution.

(b) The dyestuff obtained according to (a) corresponding as free acid to the formula

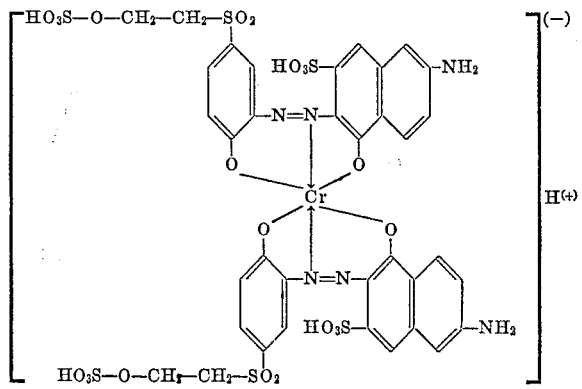

is dissolved in a mixture of 900 parts by volume of water and 20 parts by volume of 5 N sodium nitrite solution. This solution is poured, at 0°–10° C., into a mixture of 170 parts of ice powder and 20 parts by volume of concentrated hydrochloric acid. After completion of the diazotization the nitrous acid in small excess is removed by means of amido-sulfonic acid and the mixture is adjusted to the pH value of 6.0 by adding sodium bicarbonate. The mixture obtained is combined, at 5°–10° C., with a neutralized solution of 46.4 parts of 1-hydroxynaphthalene-3,6-disulfonic acid (75%) in 200 parts by volume of water. Coupling is carried out at a pH value of 6 to 6.5. After completion of the coupling the complex chromium dyestuff obtained is isolated at 120°–130° C. by spray drying. A dark blue powder is obtained containing the dyestuff of the structure

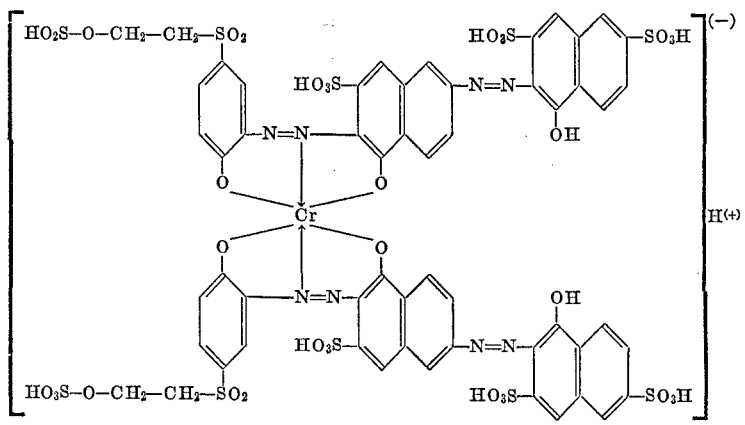

in the form of the sodium salt.

When fixing on cotton, in the presence of sodium carbonate, a navy blue print is obtained which is fast to light and to washing.

The dyestuffs listed in the following table can be prepared in a manner similar to that described in Examples 10 to 12. They also produce on cellulose materials dyeings and prints with the same good fastnesses mentioned before.

The notation numerals I or II given in the table, mean that, for the preparation of the dyestuffs according to the invention as medium component either 2-amino-5-hydroxynaphthalene-7-sulfonic acid (I) or 2-amino-5-hydroxynaphthalene-1,7-disulfonic acid (II) have been used.

phenylene, chlorophenylene, lower alkoxy phenylene, disulfo-phenylene, di(lower alkoxy) - phenylene, acetylamino-monosulfo-phenylene, carboxy-phenylene, naphthylene, monosulfo-naphthylene, disulfo-naphthylene or acetylamino-monosulfo-naphthylene, K is dihydroxyphenylene, hydroxy - naphthylene, hydroxy-monosulfo-naphthylene, hydroxy-amino-monosulfo-naphthylene, hydroxy-disulfo-naphthylene, amino - disulfo - naphthylene, hydroxy-acetylamino-monosulfo - naphthylene, hydroxy-

| Diazo component | Medium component | Coupling component | Metal | Shade |
|---|---|---|---|---|
| 2-amino-1-hydroxybenzene-4-β-hydroxyethylsulfone-sulfuric acid ester. | (I) | 1-hydroxynaphthalene-4,7-disulfonic acid | Cu | Navy blue. |
| Do | (I) | 1-hydroxynaphthalene-4,8-disulfonic acid | Cu | Do. |
| Do | (I) | 2-aminonaphthalene-5,7-disulfonic acid | Cu | Violet. |
| Do | (I) | 1-acetylamino-8-hydroxy-naphthalene-4,6-disulfonic acid. | Cu | Navy blue. |
| 2-amino-1-hydroxybenzene-5-β-hydroxyethylsulfone-sulfuric acid ester. | (I) | 1-amino-8-hydroxynaphthalene-2,4-disulfonic acid. | Cu | Greenish blue. |
| 2-amino-1-hydroxybenzene-4-β-hydroxyethylsulfone-sulfuric acid ester. | (I) | 1-hydroxynaphthalene-3,6-disulfonic acid | Cu | Navy blue. |
| Do | (I) | 3-acetylamino-5-hydroxynaphthalene-7-sulfonic acid. | Cr | Bluish grey. |
| 2-amino-1-hydroxybenzene-4-sulfonic acid | (I) | 3-(4'-N-methyl-β-chlorethyl-sulfonylamino)-benzoylamino-5-hydroxynaphthalene-7-sulfonic acid. | Cu | Navy blue. |
| 2-amino-1-hydroxybenzene-5-β-hydroxyethylsulfone-sulfuric acid ester. | (I) | 1-acethyamino-8-hydroxy-naphthalene-3,6-disulfonic acid. | Cu | Do. |
| 2-amino-1-hydroxybenzene-4-β-hydroxyethylsulfone-sulfuric acid ester. | (I) | do | Cr | Do. |
| Do | (I) | 2-hydroxynaphthalene-6,8-disulfonic acid | Cu | Do. |
| 2-amino-1-hydroxybenzene-4,6-disulfonic acid | (I) | 1-[4'-(N-methyl-β-chloroethylsulfonylamino)]-benzoylamino-8-hydroxynaphthalene-3,6-disulfonic acid. | Cu | Greenish navy blue. |
| 2-amino-1-hydroxynaphthalene-4,8-disulfonic acid | (I) | do | Cu | Navy blue. |
| 2-amino-1-hydroxy-4-(N-butylethionylamino)-benzene. | (I) | 1-amino-8-hydroxynaphthalene-2,4-disulfonic acid. | Cu | Do. |
| 2-amino-1-hydroxybenzene-4-β-hydroxyethylsulfone sulfuric acid ester. | (I) | do | Co | Do. |
| 2-amino-1-hydroxybenzene-4-sulfonic acid | | 3-(N-ethyl-ethionylamino)-5-hydroxynaphthalene-7-sulfonic acid. | Cu | Do. |
| 2-amino-1-hydroxybenzene-4-β-phenoxyethylsulfone | (I) | 1-benzoylamino-8-hydroxy-naphthalene-3,6-disulfonic acid. | Cu | Do. |
| 2-amino-1-hydroxybenzene-4-β-hydroxyethylsulfone-methylsulfonic acid ester. | (I) | 1-hydroxynapthhalene-5-sulfonic acid | Cu | Violet. |
| 4-chloro-2-amino-1-hydroxy-benzene | | 1-vinylsulfonylamino-8-hydroxynaphthalene-3,6-disulfonic acid. | Cu | Navy blue. |
| 3-amino-4-hydroxybenzoic acid | (I) | do | Cu | Do. |
| 2-amino-6-acetylamino-1-hydroxybenzene-4-sulfonic acid. | (I) | do | Cu | Do. |
| 2-amino-1-hydroxybenzene-4,6-disulfonic acid | (I) | 3-(N-methylethionylamino)-5-hydroxynaphthalene-7-sulfonic acid. | Cu | Do. |
| 2-amino-1-hydroxybenzene-4,6-disulfonic acid | (I) | 1-vinylsulfonylamino-8-hydroxy-naphthalene-3,6-disulfonic acid. | Cu | Blue. |
| 2-amino-1-hydroxybenzene-4-β-hydroxyethylsulfone-sulfuric acid ester. | (I) | 1,3-dihydroxybenzene | Cu | Brown. |
| Do | (I) | do | Co | Violet. |
| 2-amino-1-carboxybenzene-4-β-hydroxyethylsulfone-sulfuric acid ester. | (I) | 1-amino-8-hydroxynaphthalene-3,6-disulfonic acid. | Co | Navy blue. |
| Do | (I) | do | Cr | Blue. |
| 2-amino-1-hydroxybenzene-4-β-hydroxyethylsulfone-sulfuric acid ester. | (I) | 2-amino-naphthalene-3,6-disulfonic acid | Cr | Dark blue. |
| 2-amino-1-hydroxy-benzene-4-β-dimethylaminoethyl-sulfone. | (I) | 1-amino-8-hydroxynaphthalene-2,4-disulfonic acid. | Cu | Navy blue. |
| 2-amino-1-hydroxybenzene-4-β-hydroxyethylsulfone-sulfuric acid ester. | (I) | 1-vinylsulfonylamino-8-hydroxynaphthalene-3,6-disulfonic acid. | Cu | Do. |
| 2-amino-1-hydroxy-4-methoxy-benzene-5-β-hydroxy ethylsulfone sulfuric acid ester. | (I) | 1-hydroxynaphthalene-4-β-hydroxyethylsulfone sulfuric acid ester. | Cu | Do. |
| 2-amino-1-hydroxybenzene-4-β-diethylaminoethyl-sulfone. | (I) | 1-(β-diethylaminoethylsulfonyl-amino)-8-hydroxy-naphthalene-3,6-disulfonic acid. | Cu | Do. |
| 2-amino-1-hydroxybenzene-4-β-acetoxyethylsulfone | (I) | 1-acetylamino-8-hydroxy-naphthalene-3,6-disulfonic acid. | Cu | Do. |
| 2-amino-1-hydroxybenzene-4-β-hydroxyethylfulfone-sulfuric acid ester. | (I) | 1-hydroxynaphthalene-4-sulfonic acid | Cr | Do. |
| 2-amino-1-hydroxy-4-(N-methyl-vinylsulfonylamino)-benzene. | (I) | 1-acetylamino-8-hydroxynaphthalene-3,6-disulfonic acid. | Cu | Do. |
| 2-amino-6-nitro-1-hydroxy-benzene-4-β-hydroxyethyl-sulfone-sulfuric acid ester. | (I) | do | Cu | Do. |
| 2-amino-1-hydroxybenzene-4-β-hydroxyethylsulfone-sulfuric acid ester. | (II) | 1-hydroxynaphthalene-4-sulfonic acid | Cu | Violet. |
| 2-amino-1-hydroxybenzene-4-β-hydroxyethylsulfone-thiosulfuric acid ester. | (I) | 1-benzoylamino-8-hydroxy-naphthalene-3,6-disulfonic acid. | Cr | Bluish grey. |

I claim:
1. A complex copper, cobalt or chromium disazo dyestuff of the formula

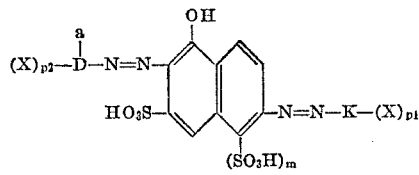

wherein D is phenylene, monosulfo-phenylene, nitro-benzoylamino - monosulfo - naphthylene, hydroxy-amino-disulfo-naphthylene, hydroxy-benzoylamino-disulfo-naphthylene, hydroxy-acetylamino-disulfo-naphthylene or hydroxy-phenylureido-disulfo-naphthylene, X is linked to D and/or K is at a position other than ortho to the azo groups and is one of the groups of the formulae $$-\left(\underset{\underset{R}{|}}{N}\right)_n-SO_2-CH=CH_2 \text{ or } -\left(\underset{\underset{R}{|}}{N}\right)_n-SO_2-CH_2-CH_2-Z$$

in which R is hydrogen or lower alkyl, Z is —Cl, —O—SO₃H, —S—SO₃H, —N(lower alkyl)₂,

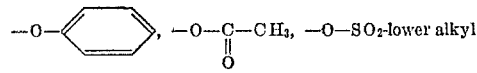

or

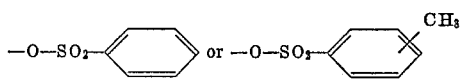

$n$ is linked to D at ortho position to the azo group and is hydroxy or carboxy, $m$, $n$, $p_1$ and $p_2$ each is an integer 0 or 1, the sum of $p_1$ and $p_2$ being at least 1, and the dyestuff is a symmetric 1:2-cobalt or chromium complex compound or a 1:1-copper complex compound.

2. The dyestuff of the formula

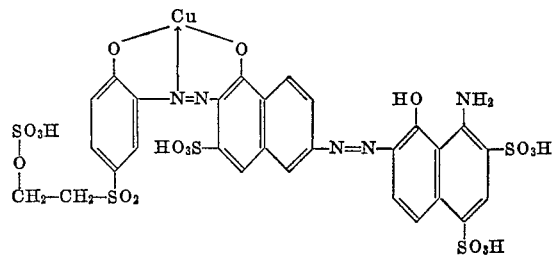

3. The dyestuff of the formula

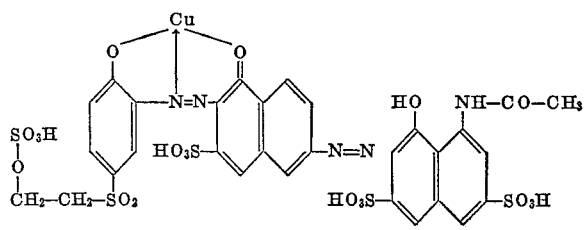

4. The dyestuff of the formula

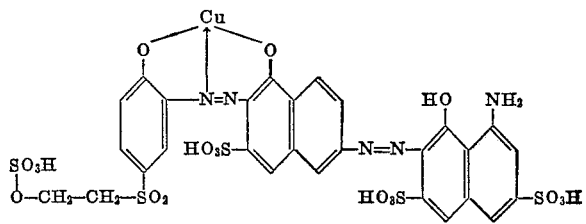

5. The dyestuff of the formula

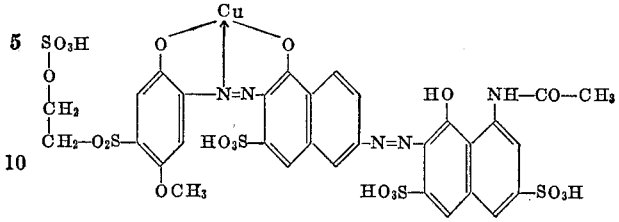

6. The dyestuff of the formula

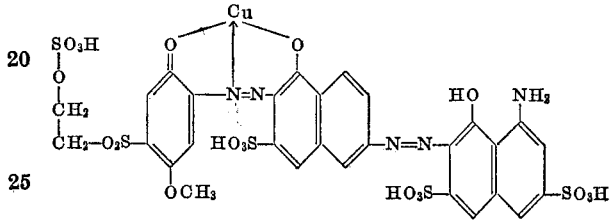

References Cited
UNITED STATES PATENTS 3,364,194  1/1968  Meininger et al. _____ 260—148

FLOYD D. HIGEL, Primary Examiner
DONALD M. PAPUGA, Assistant Examiner

U.S. Cl. X.R.

8—42, 51; 260—37, 151, 187, 189, 190, 191, 194, 198, 206, 458, 507